July 29, 1930.  F. S. CARTWRIGHT  1,771,431
AUTOMOBILE GEAR SHIFT
Original Filed March 16, 1929  4 Sheets-Sheet 2

Inventor
Forest S. Cartwright

By

Attorney

July 29, 1930.  F. S. CARTWRIGHT  1,771,431
AUTOMOBILE GEAR SHIFT
Original Filed March 16, 1929   4 Sheets-Sheet 3
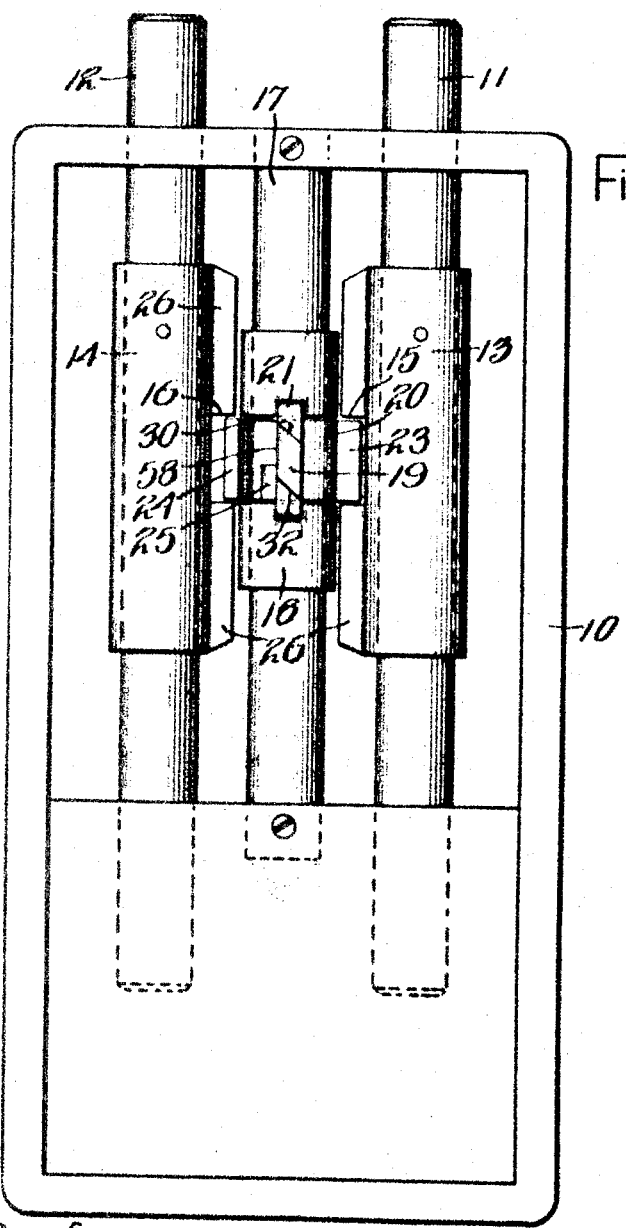
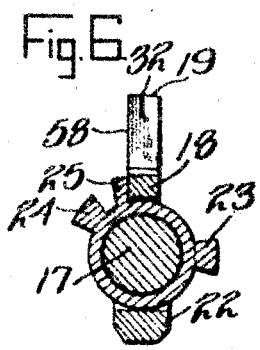
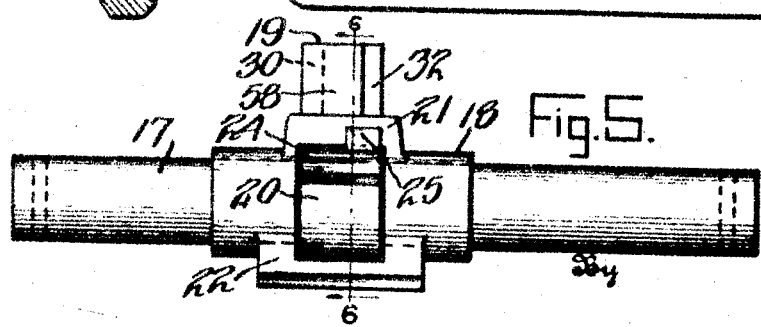
Inventor
Forest S. Cartwright July 29, 1930.  F. S. CARTWRIGHT.  1,771,431
AUTOMOBILE GEAR SHIFT
Original Filed March 16, 1929  4 Sheets-Sheet 4

Inventor
Forest S. Cartwright

By

Attorney

Patented July 29, 1930

1,771,431

UNITED STATES PATENT OFFICE

FOREST S. CARTWRIGHT, OF INDIANAPOLIS, INDIANA

AUTOMOBILE GEAR SHIFT

Application filed March 16, 1929, Serial No. 347,582. Renewed December 10, 1929.

This invention relates to automatic gear shifts for automobiles, and the principal object of the invention is to provide means for shifting the gears by simply operating the clutch pedal of the automobile.

A further object of the invention is to replace the ordinary gear shift lever in an automobile by means of which the various speed changes are made, by a single control mechanism which in this case will preferably be the clutch pedal of the automobile. The invention is similar in many respects to that shown in my co-pending application Serial No. 305,700, in the present case the means for engaging and moving the gear shifting rods consisting of a drum rotatably mounted on a shaft, instead of a table movable transversely and longitudinally of the gear shifting rods as shown in the application above referred to.

Figure 1:
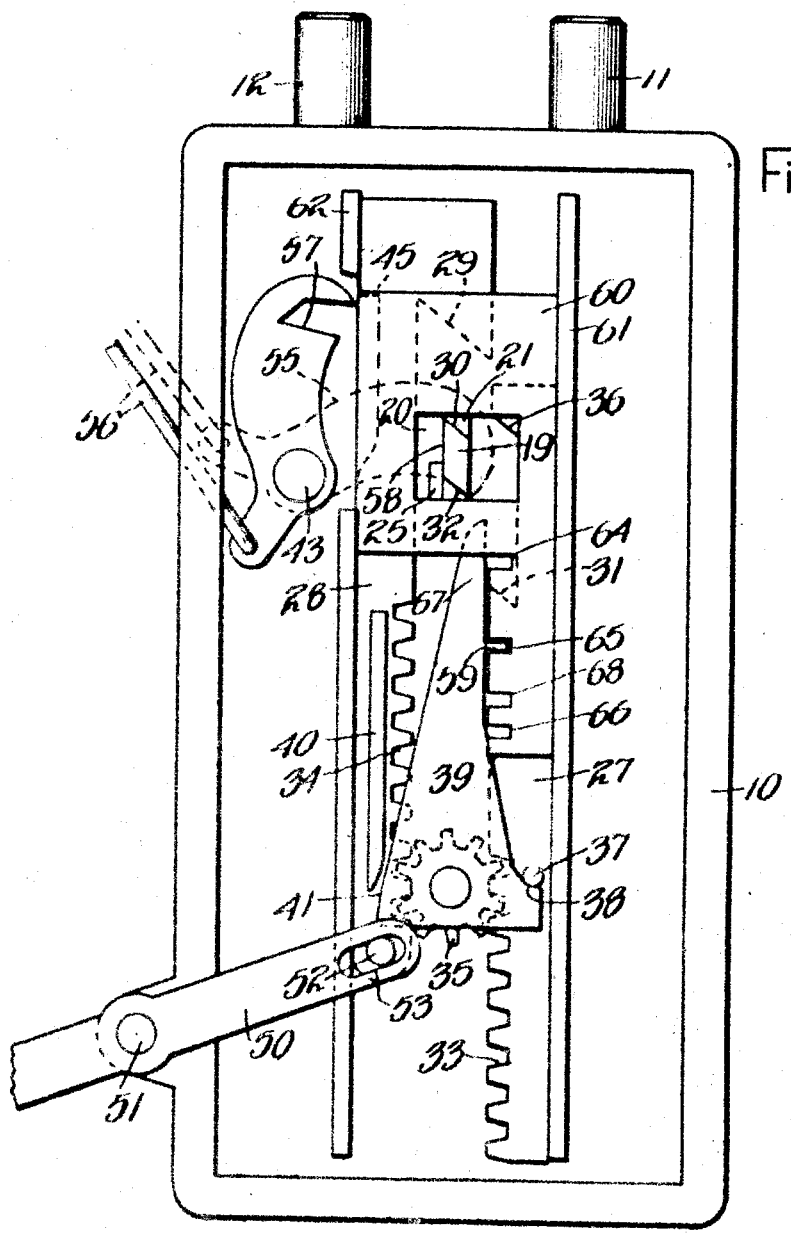
Figure 2:
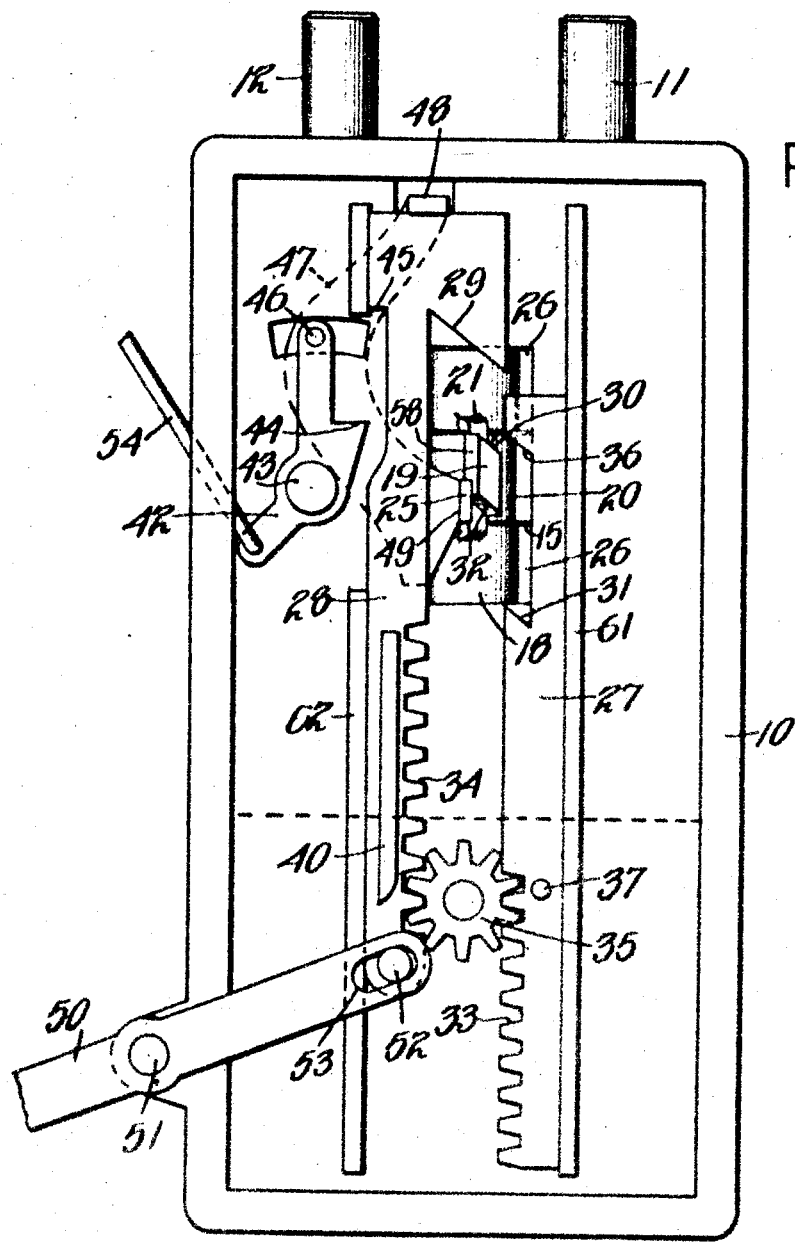
Figure 4:
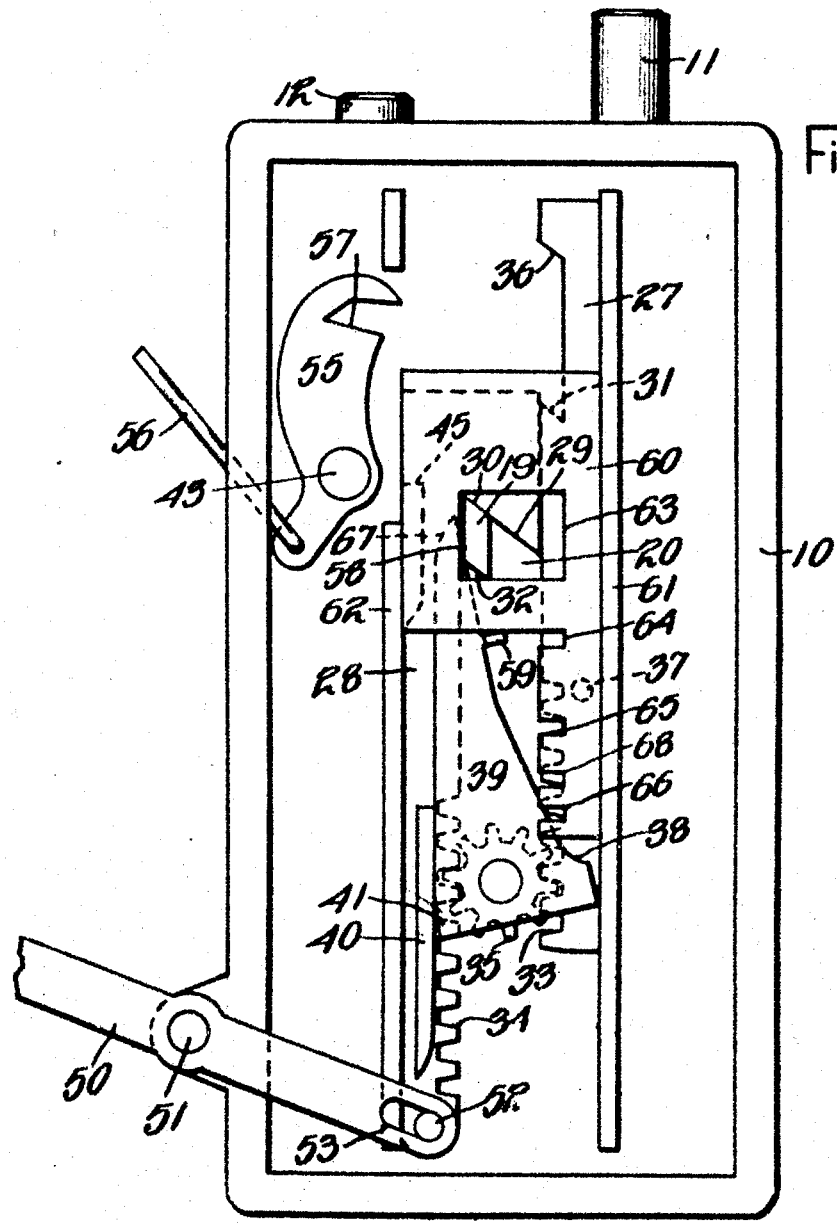

Referring to the accompanying drawings, which are made a part hereof and on which similar reference characters indicate similar parts, Figure 1 is a plan view, Figure 2 is a plan view with some of the upper elements of the device removed, Figure 3 is a plan view showing the gear shifting rods with the moving means mounted between them, Figure 4 is a view similar to Fig. 1, but with the rack bars in the position which they assume when the clutch pedal of the automobile is pushed in, Figure 5 is a detail of the drum carrying gear shifting dogs, and Figure 6 is a section on line 6—6 of Fig. 5.

In the drawings numeral 10 indicates a casing having gear shifting rods 11 and 12 of conventional construction mounted to slide therein. Collars 13 and 14 are rigidly secured upon the gear shifting rods 11 and 12 respectively. The inner sides of the collars 13 and 14 are notched at 15 and 16 to provide for means engaging these collars to move the gear shifting rods to the several positions representing the different speeds of an automobile. Mounted between the gear shifting rods and secured to the casing 10 is a bar 17 having an outer drum 18 rotatably and slidably mounted upon it. This outer drum carries on its upper side a long lug 19 by means of which the drum is moved axially of the bar as will be later described. The outer drum 18 has its central portion cut out to receive an inner drum 20. The lug 19 is mounted upon a bridge-like portion 21 within which the inner drum 20 lies. Another bridge-like portion 22 on the opposite side helps to support the ends of the drum 18. The inner drum 20 has radially extending ears 23 and 24 for engaging the notches 15 and 16 on the collars on the gear shifting rods 11 and 12. The ears 23 and 24 as shown in Fig. 5 are positioned somewhat less than 180 degrees apart. Between these ears upon the inner drum 20 is a small lug 25 by means of which the drum 20 is sometimes rotated, as will later be described. The collar 14 has on its forward inner edge flanges 26. Slidably mounted in guides 61 and 62 in a plate within the frame 10 are rack bars 27 and 28. The forward end of the rack bar 28 has a sloping notch 29 for engagement with a corresponding angular face 30 of the forward side of the lug 19. The rack bar 27 has an angular notch 31 for engagement with a rear angular portion 32 on the lug 19. The racks 33 and 34 of the rack bars 27 and 28 engage a pinion 35, which is rotatably mounted on the plate in the casing, so that its opposite edges engage the racks. The forward end of the rack bar 27 has a sloping edge 36 corresponding to the angle of the forward side of the lug 19. At a position a little to the rear of the center of the rack bar 27 is a pin 37 which upon rear movement of the rack bar strikes a shoulder 38 on a member 39 which will be further described. A relatively long lug 40 on the rack bar 28 engages a shoulder 41 on the member 39 to swing the forward portion of this member to the left when the rack bar 28 is moved to the rear, as shown in Fig. 4. A lever 42 is pivoted at 43 to the frame of the device. This lever has on its inner forward end a notch 44 for engaging a shoulder 45 on the outside edge of the rack bar 28. The forward end of the lever 42 carries a pivot pin 46 which passes down through a slot in the cover plate of the housing and carries pivotally mounted on its lower end a lever 47. The forward end of the lever 47 is bent up to provide a lug 48 engageable by the forward end of the rack bar 28. The rear end 49 of the lever 47 is adapted to strike the lug 25 when the lever is rotated in a counterclockwise direction to rotate the drum 20 to move the ear 23 into engagement with the notch 15. A lever 50 is pivoted upon the casing of the device at 51 and secured to the rear end of the rack bar 28 by means of a lug 52 positioned in a slot 53. The end of the lever 50 may be connected in any suitable way with the pedal of an automobile by means of which the rack bars 28 and 27 are reciprocated. The lever 42 has connected to its lower end a link 54 which link is connected to any suitable manually operable mechanism within reach of the driver of the vehicle. A lever 55 is pivoted to the top of the casing and has a link 56 connected to some manually operable lever within handy reach of the driver of the vehicle, by means of which the lever 55 may be swung to the position shown in dotted lines in Fig. 1. The forward end of this lever is notched having a surface 57 adapted to rest against the left hand side 58 of the lug 19 to hold this lug against rotation to the left when the sloping side 29 engages the corresponding slope 30 on the forward side of the lug 19. The purpose of this is to hold the lug 19 in position to prevent its swinging the ear 24 into engagement with the notch 16, so that the ear 23 may remain in the notch 15 on the gear shifting rod 11 to move this rod to position of reverse gear. The member 39 is pivotally mounted coincident with the axis of the pinion 35. The forward right side of this member has an upwardly extending lug 59. A plate 60 is slidably mounted in guideways 61 and 62 on the top of the casing. This plate has an opening 63 up through which the lug 19 extends. The plate 60 is notched at 64, 65, 66 and 68, with which notches the lug 59 engages to hold the plate 60 in any one of several adjustable positions, these positions representing intermediate or reverse gear, neutral, and high or low gear.

The operation of the device is as follows:
To bring the gear shift rods to neutral position the lever 42 is moved in a clockwise direction by means of the link 54 to bring the notch 44 in the path of the shoulder 45 on the rack bar 28. The clutch pedal is then pushed in until the shoulder 45 strikes the notch 44. This positions the gear shift rods for neutral position. Upon release of the clutch pedal the rack bars return to normal position, and as the bar 28 returns to forward position the forward end strikes the upturned lug 48 on the lever 47 and swings the rear of this lever, to cause the end 49 to strike against the lug 25 to rotate the inner drum 20 to bring the ear 23 into engagement with the notch 15, on the right gear shifting rod 11. The rack bars 27 and 28 are then reciprocated by means of the lever 50, which as stated, is attached to the clutch pedal of the automobile. As the rack bars move the edge 31 strikes the rear edge of the lug 19 to move the drum 18 forward, carrying with it the right hand gear shifting rod 11 to the position for low gear. The clutch pedal is then released and the rack bars are returned to normal position. As the right hand rack bar returns to the position shown in Fig. 2 the edge 36 strikes against the forward edge 30 of the lug 19 and rotates the drum 18 in a counter clockwise direction, as shown in Fig. 5, to bring the lug 19 in the path of the sloping shoulder 29 on the rack bar 28. When the clutch pedal is again manipulated to reciprocate the rack bars, as the rack bar 28 moves to the rear, the sloping shoulder 29 engages the forward side 30 of the lug 19 to move the drums 18 and 20 to the rear. These sloping surfaces as they contact tend to rotate the drum 19 to the left. The ear 24 riding along the inner and upper edge 26 on the yoke 14, however, prevents disengagement of the ear 23 from the notch 15. The gear 23 therefore must pull back the gear shifting rod 11 until it reaches the neutral position, at which time the ear 24 slides into the notch 16 on the gear shifting rod 12 and moves this to the rear to the position for intermediate gear. As the rack bar 28 moves to the rear the elongated lug 40 strikes the shoulder 41 on the pivoted member 39 and swings the forward end 67 of this member to the left, as shown in Fig. 4, so that as the rack bar reaches the rearmost position the end 67 of the member 39 will be at the left of the lug 19. When the pedal is released and the rack bars resume their normal position, the rack bar 27 by means of the lug 38 will swing the pivoted member 39 in a clockwise direction as it returns to normal position, the end 67 carrying the lug 19 to the right in position to be engaged by the shoulder 31 on the right hand rack bar. The ear 24 however is still in engagement with the notch 16 on the gear shifting rod 12. The clutch pedal is against pushed in so that the right hand rack bar moves forward and the notch 31 engaging the rear side of the lug 19 moves the drums 18 and 20 forward, the ear 24 carrying the gear shifting rod 12 to the position for high gear. As the clutch is released and the gear shifting rods resume their normal position, the sloping side 36 again striking the forward sloping side 30 of the lug 19 moves this lug into the path of the sloping shoulder 29. The clutch pedal is again pushed in, reciprocating the rack bars and the shoulder 29 on the left hand rack bar 28 striking the forward side of the lug 19 moves this lug to the rear. In this position the ear 24 is already in engagement with the gear shifting rod 12, consequently the gear shifting rod 12 is moved to intermediate gear position. As the left hand rack bar 28 reaches its rear position the lug 40 as before swings the pivoted member 39 to position its forward end to the left of the lug 19, so that upon release of the clutch pedal and the racks return to their normal position, the forward end of the member 39 will swing the lug 19 to the right to the position in which it may be engaged by the notched shoulder 31. It may readily be seen therefore that pushing in of the clutch pedal and releasing it will alternately move the gear shifting rods to high and intermediate and intermediate back to high. This of course is a great advantage as in ordinary conditions of city traffic the operator will shift from high to intermediate and from intermediate back to high more than he will shift between any other speeds. By means of the structure just defined he may do this without having to go into neutral and low gears in order to get from high to intermediate or from intermediate to high. The reverse gear is secured only when the transmission gears are in neutral or low gear positions. If the gears are in neutral, in order to put the car in reverse gear, the neutral lever 54 is first manipulated as described with the beginning of the operation, to move the drums in the position where the ear 23 is in engagement with the notch 15 on the right hand gear shifting rod. The lug 19 however remains in position to be engaged by the notch 29 on the left hand rack bar 28. The lever 55 however is manipulated to swing its forward end to the position shown in dotted lines in Fig. 1, so that the surface 57 will engage the left side 58 of the lug 19 and prevent rotation of the drum 18 as the sloping shoulder 29 engages the sloping forward edge 30 of the lug 19. As the clutch pedal is then pushed in, the rack bar 28 will move the drums 18 and 20 to the rear bringing the gear shifting rod 11 to the rear to the reverse gear position. As the gears are moved to this position, the member 39 swings counter clockwise to bring its forward end 67 to the left of the lug 19, in order to swing the lug to the right as the rack bars resume their normal position, so that the lug will be pushed in the path of the notch 31 when the clutch is again pushed in. As the lug 19 moves forward and backward from the position shown in Fig. 1, the member 39 of course is swung to the left. As the gear shifting rods are moved to their respective gear positions and the rack bars return to their normal position and the pivoted member 39 swings back to the right, the lug 59 will be positioned in one of the notches 64, 65, 66 or 68, depending upon whether the plate 39 is in the position representing intermediate or reverse gear, neutral or high or low gear. When in intermediate or reverse gear the lug 59 will engage the notch 64. When in low gear the lug will engage the notch 66. When in neutral it will engage notch 65 and when in high gear it will engage notch 68. The rod 12 does not move as far forward for high gear as the rod 11 does for low gear, hence the plate is locked in a position not quite as far forward for high gear as for low gear. The lug 59 locks the plate in position until the rack bars themselves are manipulated to swing the lever 39 to move the lug 59 out of locking engagement with the notches in the plate 60.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. In a gear shifting mechanism a pair of gear shifting rods having yokes thereon, a bar, a pair of drums slidably mounted upon the said bar, ears on one of the drums engageable with a yoke on either of the said rods, a lug on the other drum, a pair of rack bars, means on said bars engageable with the said lug for sliding the said drums axially of the said bar, and means operable at the end of movement of the rack bars for shifting the said lug to position to be engaged by the opposite rack bar whereby continuous reciprocation of the said rack bars will cause the said lug to move in a quadrilateral path, substantially as set forth.

2. In a gear shifting mechanism a pair of gear shifting rods having yokes thereon, a bar, a pair of drums slidably mounted on said bar one drum being mounted within the other, ears on the inner drum engageable with the yokes on the said rods, and a lug on the outer drum for moving the drums axially along the said bar, a pair of rack bars, means on the rack bars for moving the said drums axially of the said bar, and means on the said racks for moving the said lug into the path of the said drum moving means, substantially as set forth.

3. In a gear shifting mechanism a pair of gear shifting rods, collars mounted on said rods, an inner drum having ears engageable with the said collars, an outer drum having a lug thereon, a pair of rack bars operatively connected to each other, means on said rack bars engageable with the said lug for moving the said drum to move the said rods, and means for shifting the lug at the end of each movement of the rack bars to a position for engagement by the opposite rack bar whereby a second reciprocation of the rack bars will move the said drum in an opposite direction, substantially as set forth.

4. A mechanism to select and shift gears for use with a clutch pedal on a motor vehicle comprising means connected to the clutch pedal to move a pair of slide bars adapted to shift the gears, a drum having ears movable to engage a yoke on either of the pair of gear shifting rods, and means on the slide bars for shifting the said drum to engage alternately with the yokes on opposite gear shifting rods, substantially as set forth.

5. A gear shifting device for automobiles comprising a pair of gear shifting rods, a drum having a cylinder mounted within it, the said cylinder having ears engageable with a yoke on either of the said rods, a lug on the said outer drum, means for shifting the ears on the inner drum to engage with the yokes on the said rods, a pair of rack bars, means on the rack bars for shifting the lug on the outer drum into the path of the opposite rack bar, and manually operable means for moving the rack bars, substantially as set forth.

6. A gear shifting mechanism for automobiles comprising a link connected to a clutch pedal, a lever pivotally mounted upon the gear housing of the automobile and connected to the said link, a pair of slide bars, operative connection between the said lever and one of said bars, a rack on the inner edge of each of said bars, a pinion having its opposite sides in engagement with the said racks on the bars, whereby movement of one bar in one direction will drive the other in the opposite direction, a pair of gear shifting rods having yokes thereon, a bar, a drum slidable on the said bar, ears on the said drum movable to engage with yokes on the said rods, means on the said bars for moving the said drum longitudinally along the bar on which it is mounted, and additional means for moving the said ears into the path of a notch on the opposite rack bar, substantially as set forth.

In witness whereof, I have hereunto set my hand at Indianapolis, Indiana, this 13th day of March, A. D. nineteen hundred and twenty-nine.

FOREST S. CARTWRIGHT.